UNITED STATES PATENT OFFICE 2,646,436

HARDENED MONTAN WAX DERIVATIVES

Frederick W. Breuer, Lititz, and David T. Zentmyer, Lancaster Township, Lancaster County, Pa., assignors to Armstrong Cork Company, Lancaster, Pa., a corporation of Pennsylvania No Drawing. Application February 10, 1951, Serial No. 210,437

2 Claims. (Cl. 260—410.6)

This invention relates to hardened montan wax derivatives. More particularly, the invention relates to the production of a hard wax from montan wax by a process including subjecting bleached montan wax to esterification conditions with dihydric alcohol in an inert atmosphere and at elevated temperatures, followed by further heating at elevated temperatures at subatmospheric pressure to produce a wax of increased hardness, thereby enabling its use in the preparation of emulsion floor polishes.

Montan wax is a product which is generally obtained from brown coal. One method of producing this material includes granulating brown coal and drying the resulting granulated material to a moisture content of about 10% to 12%. The granules are then sieved to remove any powder therefrom, and the powder-free granules are extracted with a mixture containing about 85% benzol and about 15% unrefined wood alcohol containing methyl and isopropyl alcohols. This extraction is normally carried out at a temperature of about 90° C. to about 100° C. The alcohol dissolves the cell walls of the brown coal granules and frees the wax therefrom, thereby enabling the wax to be dissolved by the benzol. The wax solution is separated; and the solvent distilled off, leaving the crude montan wax as a residue.

This crude montan wax is comprised essentially of resin acids, fatty acids, and wax esters similar to those contained in carnauba wax. The similarity to carnauba wax is due to the presence of a mixture of esters of acids of high molecular weight containing 26 to 29 carbon atoms, primarily carboceric and montanic acids with 27 and 29 carbon atoms, respectively, with alcohols such as triacontyl ($C_{30}H_{61}OH$) and the like. We prefer to employ a wax which has been partially deresinified.

The crude montan waxes are somewhat limited in their utility because of the dark color which characterizes these materials.

Various methods have been proposed and used to produce a montan wax of sufficiently light color to enable its use in those instances where light color is required. These bleaching processes are well known and are typified in such patents as U. S. Patent 1,699,250, U. S. Patent 1,737,975, U. S. Patent 1,767,886, and U. S. Patent 1,777,766. Bleaching results in formation of carboxylic acids, including substantial quantities of dicarboxylic acids in amounts which may be as high as 20% of the acid content of the bleached wax.

Although the various methods of bleaching montan wax result in a product of light color, the bleached waxes so produced tend to crystallize under certain conditions of use. This tendency is believed to be caused by the presence of considerable quantities of fatty acids in the material. Methods have been proposed for treating bleached montan wax to esterify the fatty acid content thereof, but considerable difficulty has been experienced in producing a desirable material by following these methods.

Among the methods which have been proposed is one involving the esterification of bleached montan wax with a dihydric alcohol, such as ethylene glycol, butylene glycol, polyethylene glycol, and the like. The esterified products show a hardness as measured with a Shore durometer type D of at most about 45. Typical of such a process is that disclosed in Guthke et al. Patent 1,834,056. While waxes so treated may be used for many purposes, because of the comparatively low hardness, they are not particularly suitable in the preparation of emulsion floor polishes, in which preparation a hard wax is very desirable, if not necessary.

We have found that hard gel-free readily dispersible waxes can be produced from bleached montan wax by means of a process in which the bleached wax is esterified by heating in the presence of a dihydric alcohol in an inert atmosphere and thereafter splitting off dihydric alcohol from the resulting reaction product to produce the wax-like material of increased hardness. While we do not intend to be limited by any theory expressed herein, it is believed that the first stage of our process results in the esterification of the acid content of the bleached montan wax, including the dicarboxylic acid content, to produce a material which contains the following structure:

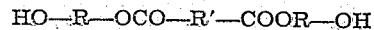

which in the case of ethylene glycol may be illustrated:

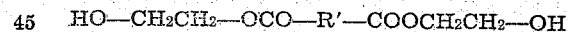

In the second stage of our process, molecules such as those represented by the above-mentioned formula combine by splitting off a dihydric alcohol, for example, ethylene glycol, to produce a material of increased molecular weight resulting in increased hardness and typified by the following structural formula:

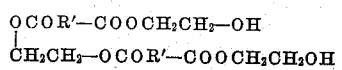

In accordance with our invention, the first stage of our process is accomplished by heating bleached montan wax in the presence of a dihydric alcohol; for example, ethylene glycol, diethylene glycol, propylene glycol, dipropylene glycol, butylene glycol, and the like, in an atmosphere of an inert gas such as nitrogen, carbon dioxide, hydrogen, and the like, at an elevated temperature. The temperature may vary between about 100° C. and about 200° C. Generally speaking, we prefer to employ a temperature between about 140° C. and about 190° C. The time of the reaction depends upon the temperature employed, the higher the temperature, the shorter the time. Generally speaking, the time of the first stage of the reaction varies between about 1 to 14 hours. Ordinarily we prefer to operate at the lower range of the temperature, because such temperatures result in the production of a lighter product. Generally speaking, it is desirable to operate sufficiently above 100° C. to enable ready removal of the water which is split off in the initial esterification reaction. In order to maintain the desired excess of dihydric alcohol in the reaction mass, it is advantageous to conduct the reaction under refluxing conditions, permitting water removal while allowing dihydric alcohol to be returned to the reaction mass.

In the second stage of the reaction, the product of the esterification is heated at an elevated temperature of at least about 180° C., preferably about 210° C. to 220° C. to split off and remove dihydric alcohol from the esterification product of the first stage. The upper temperature limit is governed by the decomposition temperature of the materials involved, a safe practical limit being about 250° C. Heating in the inert atmosphere is continued until the formation of dihydric alcohol is no longer apparent. Ordinarily this takes at least about four hours when temperatures of about 210° C. to 220° C. are employed. The second stage of the reaction is conducted at subatmospheric pressure, preferably pressure below 5 mms. of mercury. The reaction can be carried out at pressures as high as 10 mms. of mercury; but when such pressures are used, the reaction takes a considerable length of time, which is, of course, undesirable.

While any of a number of dihydric alcohols may be employed in the first stage esterification step, we find it advantageous to employ a dihydric alcohol which is readily distillable at temperatures below about 250° C. under subatmospheric pressures, such as up to 10 mms. of mercury. Ordinarily we obtain best results when about 10% to 20% excess of dihydric alcohol is employed. This excess is based upon the acidity of the bleached montan wax as determined by the acid number.

In both the first stage and second stage of the process, it is, generally speaking, desirable to have present a catalytic amount, for example up to about 1% by weight of the reaction mass, of an esterification catalyst, such as zinc chloride, sulfuric acid, p-toluene sulfonic acid, and the like.

A preferred embodiment of our invention is illustrated in the following specific example:

Example I

A 4-necked 300 ml. round bottom flask was fitted with a mechanically operated stirrer, thermometer, gas inlet tube, and 12" Vigreaux column with heating jacket. The flask was charged with 50 grams bleached montan wax having an acid number of 172, 10 ml. of ethylene glycol, and 0.005 grams of anhydrous $ZnCl_2$. The mixture was heated with stirring at 180° to 190° C. for about 3 hours in a slow stream of nitrogen gas. The column temperature was maintained at approximately 110° C. At the end of this time, there was no evidence of escaping water vapor at the end of the column when tested with a cold watch glass. The column was replaced with a distillation head capable of being heated electrically to 220° C. A condenser and receiver were added, and the apparatus attached to a vacuum pump. Heating was then conducted at 210° to 220° C. at 5 to 10 mm. pressure in the presence of nitrogen gas for about four hours, after which time no appreciable quantity of glycol was noted to condense. The resulting product was considerably harder than the straight ethylene glycol ester. It showed a hardness of 55, as measured by a Shore durometer type D, as compared to a value of 45 for the primary esterification product.

The Shore durometer hardness test is described in "The Chemistry and Technology of Waxes" by Albin H. Warth (Reinhold Publishing Company—1947).

The products of our invention may be readily emulsified to produce an emulsion type floor wax characterized by unusual hardness due to the particular process by which the montan wax derivative is prepared. Such waxes may be used in the care of all type of flooring, including wood floors and hard surface floor covering, such as linoleum, felt base, plastic type floorings, asphalt tile, and the like.

We claim:

1. A process of producing a montan wax derivative of increased hardness comprising heating said wax in the presence of dihydric alcohol at a temperature between about 140° C. and about 190° C. and in an inert atmosphere to esterify the acid content of said wax, including the dicarboxylic acid content thereof, and thereafter heating the resulting esterification product at a temperature of about 210° C. to about 220° C. at a subatmospheric pressure of less than 5 mms. of mercury until dihydric alcohol ceases to be split off.

2. A process of producing a montan wax derivative of increased hardness comprising refluxing said wax in the presence of ethylene glycol at a temperature between about 140° C. and about 190° C. in an atmosphere of nitrogen to esterify the acid content of said wax, including the dicarboxylic acid content thereof, and thereafter heating the resulting esterification product at a temperature between about 210° C. and about 220° C. at a subatmospheric pressure of less than about 5 mms. of mercury for a period of at least four hours.

FREDERICK W. BREUER.
DAVID T. ZENTMYER.

References Cited in the file of this patent

UNITED STATES PATENTS

| Number | Name | Date |
|---|---|---|
| 1,972,459 | Pungs | Sept. 4, 1934 |
| 1,990,615 | Rodrian et al. | Feb. 12, 1935 |